United States Patent [19]
Fukke et al.

[11] Patent Number: 4,789,581
[45] Date of Patent: Dec. 6, 1988

[54] MAGNETIC RECORDING MEDIUM

[75] Inventors: Hajime Fukke, Tama; Motoo Akagi; Yoshiki Kato, both of Tokyo; Waichi Nagashiro, Kanagawa, all of Japan

[73] Assignee: Hitachi, Ltd., Tokyo, Japan

[21] Appl. No.: 82,213

[22] Filed: Aug. 6, 1987

[30] Foreign Application Priority Data

Aug. 15, 1986 [JP] Japan .................................. 61-190518

[51] Int. Cl.$^4$ ............................................... G11B 5/70
[52] U.S. Cl. ....................................... 428/65; 427/131; 428/323; 428/336; 428/694; 428/413; 428/900
[58] Field of Search ............... 428/323, 413, 694, 900, 428/65, 336; 427/131

[56] References Cited

U.S. PATENT DOCUMENTS

| | | | |
|---|---|---|---|
| 4,122,234 | 10/1978 | Lohoff | 428/481 |
| 4,397,751 | 8/1983 | Dickstein et al. | 428/694 |
| 4,487,802 | 12/1984 | Miyoshi et al. | 427/131 |
| 4,583,145 | 4/1986 | Monnich et al. | 427/131 |
| 4,666,769 | 5/1987 | Miyata et al. | 427/131 |
| 4,696,859 | 9/1987 | Miyoshi et al. | 428/694 |

Primary Examiner—Paul J. Thibodeau
Attorney, Agent, or Firm—Antonelli, Terry & Wands

[57] ABSTRACT

A sufficient reproduced output can be attained even in a coating thickness of as small as 1 μm, preferably 0.1 to 0.5 μm with a magnetic recording medium comprising a substrate and a coating film containing magnetic powder formed on the substrate, wherein the content of the magnetic powder in the coating film is 66 to 90% by weight.

15 Claims, 1 Drawing Sheet

MAGNETIC RECORDING MEDIUM

BACKGROUND OF THE INVENTION

This invention relates to a magnetic recording medium. More particularly, the present invention is concerned with a high-density magnetic recording medium which is excellent in recording and reproducing properties.

In recent years, an increasing demand for a magnetic recording medium, such as a magnetic disk, having a higher density brought about a tendency towards reduction in the thickness of a coating film containing a ferromagnetic substance. Specifically, the thickness of the coating film which was 4 to 5 $\mu$m in the past has been reduced to 1 $\mu$m or less in recent years (see the textbook of the 615th institute of the Japan Society of Mechanical Engineers, p. 84, January 1986).

Such a magnetic disk can be produced by a method which comprises dispersing ferromagnetic powder in a binder such as a composition comprised of an epoxy resin, a phenolic resin and a vinyl resin or cellulose to prepare a paint, applying the paint on a substrate to form a coating film, and curing the coating film (see Japanese Patent Laid-Open Nos. 66803/1979, 183625/1982, and 136028/1985). The paint used in the above-mentioned method may contain a filler such as alumina.

In the above-mentioned prior art method, to consideration was paid on a problem that the reduction in the thickness of the coating film caused a decrease in the amount of magnetic powder per unit area and, therefore, brought about a decrease in the reproduced output.

As mentioned above, a magnetic disk is produced using a paint containing magnetic powder dispersed therein. It is noted in this connection that, when the proportion of the magnetic powder is high, the magnetic powder coagulates so that it cannot be uniformly dispersed. As can be seen also from the above-mentioned Japanese Patent Laid-Open Specifications, the content of magnetic powder in the coating film in the case where a uniform dispersion of the magnetic powder was attained was 55 to 60% by weight with only one exception of uniform dispersion being attained when the content exceeded 60% by weight, i.e., when the content was 65% by weight. When the content of the magnetic powder was 65% by weight, not only the coating film is weak but also various cares should be taken on the storage of the paint.

In the case of a magnetic tape, the magnetic powder may be used in an amount of as much as about 80% by weight. This is because the thickness of the magnetic tape is as large as 4 to 5 $\mu$m and is produced using a paint having a high viscosity, i.e., a paint having a high binder concentration, which makes it possible to uniformly disperse a larger amount of the magnetic powder.

On the other hand, in a high-density magnetic disk, the coating film should be thin, which requires the use of a paint having a low viscosity in the formation thereof. Therefore, in this case, the coating film is formed using a paint having a low binder concentration, i.e., a paint of which the magnetic powder content cannot be remarkably increased. As mentioned above, since the conventional high density magnetic disk has a coating film having a low magnetic powder content, it was difficult to improve the recording and reproducing properties.

SUMMARY OF THE INVENTION

An object of the present invention is to provide a high density magnetic recording medium free from drawbacks accompanying the above-mentioned conventional magnetic recording medium and having excellent recording and reproducing properties.

In order to attain the above-mentioned object, the magnetic recording medium of the present invention comprises a coating film containing magnetic powder and formed on a non-magnetic substrate, wherein the coating film contains the magnetic power in an amount of 66 to 90% by weight, preferably 70 to 90% by weight based on the coating film and has a thickness of 1 $\mu$m or less, preferably 0.1 to 0.5 $\mu$m.

When the magnetic powder content, i.e., magnetic powder content of the coating film in terms of the amount of the magnetic powder based on the total amount of the magnetic powder, binder and filler, is 66% by weight or more, the reproduced output is higher than that of the conventional magnetic recording medium. Particularly, a magnetic powder content of 70% by weight or more leads to a further enhanced reproduced output. However, when the magnetic powder content is too high, the content of the binder is low, which leads to a lowering in the coating film strength. Therefore, it is preferred that the content of the magnetic powder be 90% by weight or less.

When the thickness of the coating film exceeds 1 $\mu$m, the resolution and overwriting properties are unfavorably lowered. In view of this, the thickness of the coating film is preferably 0.5 $\mu$m or less. Since the reproduced output is lowered when the thickness of the coating film is too small, a more preferred thickness is 0.1 $\mu$m or more. However, the lower limit of the thickness of the coating film is not limited to the above-mentioned value since the lower limit may vary according to the applications of the magnetic recording medium.

When the filler is used, it is preferred that the amount of the filler added be 1 to 5 wt% based on the coating film. When the amount of the filler added is less than 1% by weight, an improvement in the reliability of coating attained by addition of the filler is unsatisfactory. On the other hand, when the amount of the filler added exceeds 5% by weight, the disk noise is unfavorably increased. As mentioned above, although the addition of the filler contributes to an improvement in the reliability of the coating film, the magnetic recording film having a coating film to which the filler has not been added may also be put to practical use. Examples of the filler include particulate alumina, zirconia, silicon carbide, tungsten carbide, sintered aluminium silicate, and calcium carbonate. It is preferred that these filler materials have a particle diameter such that the median value is slightly larger than the thickness of the coating film, usually by about 10% larger than the thickness of the coating film. Specifically, the particle diameter of the filler material is preferably 0.2 to 1.2 $\mu$m.

The magnetic powder may be any of the ferromagnetic material powders which have been incorporated in the coating film of conventional magnetic recording media, and especially the ferromagnetic iron oxide powder can be generally employed.

DETAILED DESCRIPTION OF THE INVENTION

The magnetic recording medium of the present invention can be produced, e.g., by modifying the conventional percentage compositions of the binder which is one of the raw materials and the conventional method of mixing the binder.

Specifically, in a binder comprising an epoxy resin, a phenolic resin, and a vinyl resin, the content of the vinyl resin and the content of the total of the epoxy resin and phenolic resin are set in the range from 16 to 75% by weight and 25 to 84% by weight, respectively. Hitherto, the content of the vinyl resin and the content of the total of the epoxy resin and phenolic resin were generally 10 to 20% by weight and 80 to 90% by weight, respectively. The weight ratio of the epoxy resin to the phenolic resin may be commonly accepted one, i.e., in the range from about 3:7 to 7:3. This ratio may be slightly deviated from the above-mentioned range depending on the kinds of the epoxy resin and the phenolic resin and may be in the range from 2:8 to 8:2. The amount of the vinyl resin based on 100 parts by weight of the magnetic powder is 7% by weight or more, preferably 8% by weight or more. It is important in this connection that the magnetic powder and the vinyl resin be the first to be mixed. The upper limit of the amount of the vinyl resin is spontaneously determined by the content of the magnetic powder and the content of the vinyl resin in the binder. Further, when a filler is used, it is mixed with the magnetic powder and the vinyl resin, and the upper limit of the amount of the filler is spontaneously determined by the content of the magnetic powder and the amount of the vinyl resin. Specifically, the determination of the content of the magnetic powder leads to the determination of the total amount of the binder and the filler, and the amount of the vinyl resin is first determined. Therefore, the balance is the total of the amount of the binder components exclusive of the vinyl resin and the amount of the filler. Thus, the determination of the lower limit of the amount of the binder exclusive of the vinyl resin leads to determination of the upper limit of the amount of the filler. Examples of the epoxy resin, phenolic resin, and vinyl resin include those as described in the above-mentioned Japanese Patent Laid-Open Specifications. However, they are not limited to these resins and other resins may also be used as a matter of course.

Examples of the epoxy resin include bisphenol A type epoxy resin and novolac type epoxy resin. Examples of the vinyl resin include polyvinyl butyral, polyvinyl formal, polyvinyl acetate, vinyl chloride/vinyl acetate copolymer, methacrylic acid, methyl methacrylate, and polyvinyl methyl ether.

When a thin coating film, e.g., a coating film having a thickness of 0.4 to 0.2 μm, is desired, it is preferred that a high-molecular weight, long-chain phenolic resin, e.g., polyvinylphenol or vinylphenol/methyl methacrylate copolymer, be used.

Examples of the solvent of the binder include polyalcohol derivatives such as cellosolve acetate and butyl cellosolve and ketones such as cyclohexanone and isophorone. In order to form a coating film having a thickness of 1 μm or less, it is preferred that the concentration of the binder be 2.7 to 9.4% by weight.

However, the magnetic recording medium produced by the above-mentioned method may be relatively low in hardness. Therefore, when a coating film having a high hardness is required, it is preferred that the coating film be produced by other particular methods.

One of such methods comprises providing a substrate, particularly an aluminum substrate, applying a silane coupling agent as an intermediate layer on the surface of the substrate, drying the intermediate layer, and applying thereon a magnetic paint prepared by dispersing magnetic powder in a binder, followed by heat setting. It is required in this connection that the silane coupling agent have an amino group or an epoxy group at its terminal. In the heat setting, the crosslinking is caused between the epoxy-phenolic resin and the silane coupling agent and between the silane coupling agent and the aluminum substrate, which contributes to an improvement in the adhesion of the magnetic coating film to the aluminum substrate, thus improving the hardness of the magnetic coating film.

Examples of the silane coupling agent include γ-aminoethyltriethoxysilane represented by the chemical formula $NH_2(CH_2)_2Si(OC_2H_5)_3$, γ-aminopropyltriethoxysilane represented by the chemical formula $NH_2(CH_2)_3Si(OC_2H_5)_3$, N-β-aminoethyl-γ-aminopropyltriethoxysilane represented by the chemical formula $H_2N(CH_2)_2NH(CH_2)_3Si(OCH_3)_3$, N-β-(aminoethyl)-γ-aminopropylmethyldimethoxysilane represented by the chemical formula

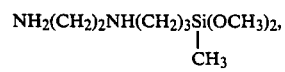

γ-glycidoxypropyltrimethoxysilane represented by the chemical formula

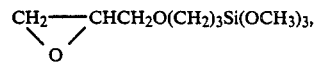

and β-(3,4-epoxycyclohexyl)ethyltrimethoxysilane represented by the chemical formula

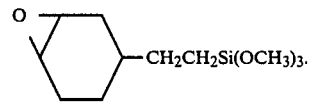

The thickness of the coating film of the silane coupling agent is preferably 0.02 to 2 μm. It is difficult to form a coating film having a thickness of less than 0.02 μm. On the other hand, when the thickness of the coating film exceeds 2 μm, the adhesion tends to unfavorably lower.

Another method of increasing the hardness of the coating film comprises applying a paint on a substrate and pressing the resulting magnetic recording medium at a temperature equal to or above the melting point of the binder and equal to or below the curing initiation temperature.

In a coating film, particularly a thin film, having a high content of the magnetic powder, the binder is absorbed to the magnetic powder and is also present around the resulting powder. However, it is believed that the binder does not completely fill the gaps between the magnetic powder particles, thereby forming voids. Therefore, if the voids could be broken and the gaps between the magnetic powder particles be filled with the binder, a dense coating film can be obtained. With respect to the pressing conditions, the highest pressing efficiency can be attained at a temperature range in which the thermosetting resin is most easily softened and flowed, i.e., at a temperature equal to or above the melting point of the thermosetting resin and equal to or below the curing initiation temperature, because such a temperature range enables the pressing under a low pressure, i.e., a pressure of 0.1 kg/cm² or higher.

The material of the substrate may be non-magnetic material as in the conventional magnetic recording medium.

DESCRIPTION OF THE PREFERRED EMBODIMENTS

EXAMPLE 1

Figure 1:
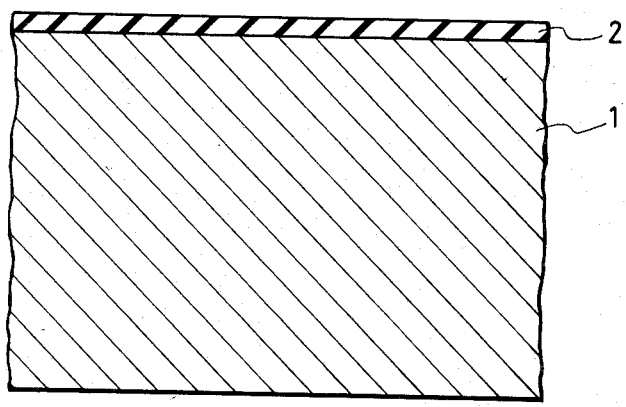
FIG. 1 is a cross-sectional view of one form of the magnetic recording medium of the present invention.

700 parts by weight of magnetic powder of iron oxide (γ-EXD, a product of Chitan Kogyo Kabushiki Kaisha in Japan), 60 parts by weight of a polyvinyl butyral, and 40 parts by weight of single crystal alumina having a particle diameter of 0.7 μm were fed into a kneader and were mixed with each other therein for about 15 min. 800 parts by weight of cellosolve acetate was gradually added to the resulting mixture and kneaded for 8 hr. 690 parts by weight of the resulting kneading product was placed in a ball-mill pot, followed by addition of 350 parts by weight of cellosolve acetate thereto. The mixture was kneaded in the ball-mill pot for 3 days to disperse the magnetic powder. A solution obtained by dissolving 56 parts by weight of a phenol intermediate having a molecular weight of 300 (Methylon 75108, a product of General Electric Co.) and 56 parts by weight of an epoxy resin (Epikote 1007, a product of Shell Petroleum Chemicals Inc.) in 770 parts by weight of butyl cellosolve is added thereto, thereby preparing a magnetic paint. As shown in FIG. 1, the magnetic paint thus obtained was applied by spin coating on an aluminum substrate 1 having a diameter of 14 in. the surface of which had been previously cleaned, followed by magnetic alignment. The resulting coating film 2 was then cured to obtain a magnetic disk (magnetic hard disk). The thickness of the coating film and the roughness of the coating surface of the magnetic disk having a magnetic powder content of 66% by weight were 0.6 μm and 0.040 μm Ra at a position of R 105 mm, respectively, before fabrication of the coating film, and were 0.35 μm and 0.010 μmRa, respectively, after fabrication of the coating film.

EXAMPLE 2

A magnetic disk was prepared in substantially the same manner as in EXAMPLE 1, except that a phenolic resin having a molecular weight of about 5000 (Resin M, a product of Maruzen Sekiyu Kabushiki Kaisha in Japan) was used instead of the phenol intermediate used in EXAMPLE 1 and that the butyl cellosolve for dissolving the phenolic resin and the epoxy resin was used in an amount of 1050 parts by weight. The thickness of the coating film and the roughness of the coating film surface of the magnetic disk having a magnetic powder content of 66% by weight were 0.2 μm and 0.030 μm Ra at a position of R 105 mm, respectively, before fabrication of the coating film. The coating film surface was free from any visible defects such as protrusions, streaks, and pores. The thickness of the coating film and the roughness of the coating film surface after fabrication of the coating surface were 0.1 μm and 0.010 μm Ra, respectively.

EXAMPLE 3

A magnetic disk was prepared in substantially the same manner as in EXAMPLE 1, except that 30 parts by weight of a phenolic resin (molecular weight: about 5000) of the same kind as that used in EXAMPLE 2 was used instead of the phenol intermediate used in EXAMPLE 1 and that the amounts of the epoxy resin and the butyl cellosolve for dissolving the phenolic resin and the epoxy resin were 30 parts by weight and 800 parts by weight, respectively. The thickness of the coating film and the roughness of the coating film surface of the resulting magnetic disk having a magnetic powder content of 70% by weight were 0.2 μm and 0.035 μm Ra at a position of R 105 mm, respectively, before fabrication of the coating film. The coating film surface was free from any visible defects such as protrusions, streaks, and pores. The thickness of the coating film and the roughness of the coating film surface after fabrication of the coating surface were 0.1 μm and 0.011 μm Ra, respectively.

EXAMPLE 4

A magnetic disk was prepared in substantially the same manner as in EXAMPLE 1, except that 16 parts by weight of a phenolic resin (molecular weight: about 5000) of the same kind as that used in EXAMPLE 2 was used instead of the phenol intermediate used in EXAMPLE 1 and that the amounts of the epoxy resin of the same kind as that used in EXAMPLE 1 and the butyl cellosolve for dissolving the phenolic resin and the epoxy resin were 16 parts by weight and 740 parts by weight, respectively. The thickness of the coating film of the resulting magnetic disk having a magnetic powder content of 80% by weight was 0.2 μm before fabrication of the coating film. The coating film surface was free from any visible defects such as protrusions, streaks, and pores.

EXAMPLE 5

700 parts by weight of magnetic powder of the same kind as that used in EXAMPLE 1 and 60 parts by weight of a polyvinyl butyral were fed into a kneader and were mixed with each other therein for about 15 min. 800 parts by weight of cellosolve acetate was gradually added to the resulting mixture and was kneaded for 8 hr. 670 parts by weight of the resulting kneading product was placed in a ball-mill pot, followed by addition of 320 parts by weight of cellosolve acetate thereto. The mixture was kneaded in the ball-mill pot for 3 days to disperse the magnetic powder. A solution obtained by dissolving 4 parts by weight of a phenolic resin (molecular weight: 5,000) of the same kind as that used in EXAMPLE 2 and 4 parts by weight of an epoxy resin of the same kind as that used in EXAMPLE 1 in 580 parts by weight of butyl cellosolve was added thereto, thereby preparing a magnetic paint. The magnetic paint thus obtained was applied by spin coating on an aluminum substrate having a diameter of 14 in. the surface of which had been previously cleaned, followed by magnetic alignment. The resulting coating film was then cured to obtain a magnetic disk. The thickness of the coating film of the magnetic disk thus obtained and having a magnetic power content of 90% by weight was 0.2 μm. The coating film surface was free from any visible defects such as protrusions, streaks, and pores.

EXAMPLE 6

A magnetic disk was prepared in substantially the same manner as in EXAMPLE 5, except that a phenol intermediate (molecular weight: 300) of the same kind as that used in EXAMPLE 1 was used instead of the phenolic resin used in EXAMPLE 5 and that the amount of the butyl cellosolve for dissolving the epoxy resin was 450 parts by weight. The thickness of the coating film of the magnetic disk thus obtained and having a magnetic powder content of 90% by weight was 0.4 μm. The coating film surface was free from any visible defects such as protrusions, streaks, and pores.

COMPARATIVE EXAMPLE 1

700 parts by weight of magnetic powder of the same kind as that used in EXAMPLE 1, 40 parts by weight of a polyvinyl butyral, and 40 parts by weight of single crystal alumina having a particle diameter of 0.7 μm were fed into a kneader and were mixed with each other therein for about 15 min. 800 parts by weight of cellosolve acetate was gradually added to the resulting mixture and kneaded for 8 hr. 680 parts by weight of the resulting kneading product was placed in a ball-mill pot, followed by addition of 330 parts by weight of cellosolve acetate thereto. The mixture was kneaded in the ball-mill pot for 3 days to disperse the magnetic powder. A solution obtained by dissolving 34 parts by weight of a phenol intermediate (molecular weight: 300) of the same kind as that used in EXAMPLE 1 and 34 parts by weight of an epoxy resin of the same kind as that used in EXAMPLE 1 in 600 parts by weight of butyl cellosolve was added thereto, thereby preparing a magnetic paint. The magnetic paint thus obtained was applied by spin coating on an aluminum substrate having a diameter of 14 in. the surface of which had been previously cleaned, followed by magnetic alignment. The resulting coating film was then cured to obtain a magnetic disk. The thickness of the coating film of the resulting magnetic disk thus obtained and having a magnetic powder content of 70% by weight was 0.4 μm at a position of R 105 mm before fabrication of the coating film. Visible defects such as protrusions, streaks, and pores were observed with the naked eye on the surface of the coating film. Further, the coating film had a rough surface, and the fabrication of the coating film could not provide a coating film having a surface roughness of 0.015 μmRa or less.

COMPARATIVE EXAMPLE 2

700 parts by weight of magnetic powder of the same kind as that used in EXAMPLE 1, 40 parts by weight of a polyvinylbutyral, and 40 parts by weight of single crystal alumina having a particle diameter of 0.7 μm were fed into a kneader and were mixed with each other therein for about 15 min. 800 parts by weight of cellosolve acetate was gradually added to the resulting mixture and kneaded for 8 hr. 680 parts by weight of the resulting kneading product was placed in a ball-mill pot, followed by addition of 330 parts by weight of cellosolve acetate thereto. The mixture was kneaded in the ball-mill pot for 3 days to disperse the magnetic powder. A solution obtained by dissolving 34 parts by weight of a phenolic resin (molecular weight: 5000) of the same kind as that used in EXAMPLE 2 and 34 parts by weight of an epoxy resin of the same kind as that used in EXAMPLE 1 in 800 parts by weight of butyl cellosolve was added thereto, thereby preparing a magnetic paint. The magnetic paint thus obtained was applied by spin coating on an aluminum substrate having a diameter of 14 in. the surface of which had been previously cleaned, followed by magnetic alignment. The resulting coating film was then cured to obtain a magnetic disk. The thickness of the coating film of the resulting magnetic disk thus obtained and having a magnetic powder content of 70% by weight was 0.2 μm at a position of R 105 mm before fabrication of the coating film. Visible defects such as protrusions, streaks, and pores were observed with the naked eye on the surface of the coating film. Further, the coating film had a rough surface, and the fabrication of the coating film could not provide a coating film having a surface roughness of 0.015 μmRa or less.

EXAMPLE 7

Figure 2:
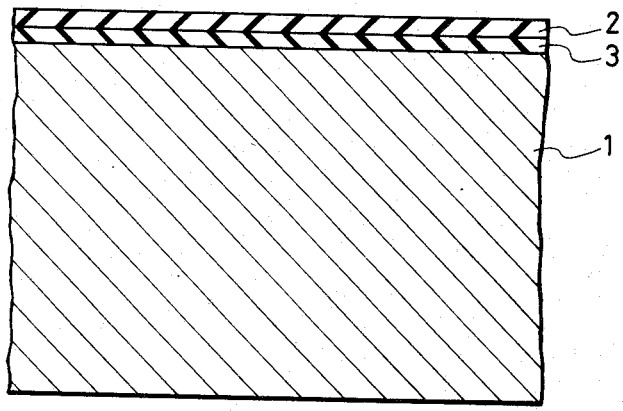
FIG. 2 is a cross-sectional view of another form of the magnetic recording medium of the present invention.

700 parts by weight of magnetic powder of the same kind as that used in EXAMPLE 1, 60 parts by weight of a polyvinyl butyral, and 40 parts by weight of single crystal alumina having a particle diameter of 0.7 μm were fed into a kneader and were mixed with each other therein for about 15 min. 800 parts by weight of cellosolve acetate was gradually added to the resulting mixture and kneaded for 8 hr. 690 parts by weight of the resulting kneading product was placed in a ball-mill pot, followed by addition of 350 parts by weight of cellosolve acetate thereto. The mixture was kneaded in the ball-mill pot for 3 days to disperse the magnetic powder. A solution obtained by dissolving 30 parts by weight of a phenolic resin of the same kind as that used in EXAMPLE 2 and 30 parts by weight of an epoxy resin of the same kind as that used in EXAMPLE 1 in 500 parts by weight of butyl cellosolve was added thereto, thereby preparing a magnetic paint. As shown in FIG. 2, a solution prepared by dissolving 10 parts by weight of N-β-aminoethyl-γ-aminopropylmethyldimethoxysilane in 90 parts by weight of butyl cellosolve was applied by spin coating on an aluminum substrate 1 the surface of which had been previously cleaned. Immediately after the spin coating, the above-prepared magnetic paint 2 was applied by spin coating, followed by magnetic alignment. The thickness of the magnetic coating film of the magnetic disk thus obtained was 0.6 to 0.8 μm. On the other hand, the thickness of the silane coupling agent 3 was about 0.5 μm. The magnetic disk coating film was cured by an ordinary method to obtain a magnetic disk. The magnetic disk thus obtained was applied to a pencil hardness test and exhibited a hardness of 7H. Separately, the above-prepared magnetic paint was directly applied by spin coating on an aluminum substrate the surface of which had been previously cleaned, followed by magnetic alignment. The magnetic disk coating film thus obtained was cured by an ordinary method to obtain a magnetic disk. The magnetic disk exhibited a pencil hardness of 1H.

EXAMPLE 8

700 parts by weight of magnetic powder of the same kind as that used in EXAMPLE 1, 60 parts by weight of a polyvinyl butyral, and 40 parts by weight of single crystal alumina having a particle diameter of 0.7 μm were fed into a kneader and were mixed with each other therein for about 15 min. 800 parts by weight of cellosolve acetate was gradually added to the resulting mixture and kneaded for 8 hr. 690 parts by weight of the resulting kneading product was placed in a ball-mill pot, followed by addition of 350 parts by weight of cellosolve acetate thereto. The mixture was kneaded in the ball-mill pot for 3 days to disperse the magnetic powder. A solution obtained by dissolving 30 parts by weight of a phenolic resin of the same kind as the used in EXAMPLE 2 and 30 parts by weight of an epoxy resin of the same kind as that used in EXAMPLE 1 in 600 parts by weight of butyl cellosolve was added, thereby preparing a magnetic paint. The magnetic paint thus obtained was applied by spin coating on an aluminum substrate the surface of which had been previously cleaned, followed by magnetic alignment. The resulting coating film was dried to give a magnetic disk coating film. The thickness of the magnetic disk coating film thus obtained was 0.6 to 0.8 $\mu$m. A weight was put on the magnetic disk coating film so as to apply a pressure of 100 g/cm$^2$ thereto and allowed to stand in a constant temperature bath of 100° C. for 2 hr. Thereafter, the magnetic disk coating film was cured by an ordinary method to obtain a magnetic disk. It is noted in this connection that no pressure was applied to the magnetic disk coating film during the curing.

The magnetic disk thus obtained was applied to a pencil hardness test and exhibited a hardness of 8H. Separately, the above-prepared magnetic paint was applied on an aluminum substrate, followed by magnetic alignment. The resulting magnetic disk coating film was cured by an ordinary method to obtain a magnetic disk. This magnetic disk is different from the above-mentioned magnetic disk in that the application of a pressure of 100 g/cm$^2$ in a constant-temperature bath of 100° C. was omitted in the production thereof. The magnetic disk thus obtained was applied to the pencil hardness test and exhibited a hardness of 2H.

In the above-mentioned examples, it was found that even when the thickness of the coating film was suitably reduced as the magnetic powder content was increased, the magnetic recording disk exhibited a tendency to increase the reproduced output and an improvement in resolution.

The present invention enables the formation of a thin coating film, e.g., a coating film having a thickness as small as 0.2 $\mu$m by virtue of a magnetic powder content of 66% to 90%, which contributes to an enhancement of the reproduced output and the resolution. Further, since the thickness of the coating film to be applied is small, the amount of the coating film to be fabricated can be remarkably reduced, which enables a remarkable reduction in time required for fabrication of the coating film as well as a remarkable reduction in the occurrence of scratch, thus leading to a reduction in defects of the magnetic disk, particularly errors accompanying recording and reproduction, i.e., insufficient output due to deterioration or falling off of the coating film caused by the occurrence of scratch or the like and errors due to bit drop.

Further, the fabrication of the coating film of the above-mentioned thin film coated medium enabled the formation of a magnetic recording medium capable of high-density recording and reproduction to substantially the same extent as that attained by a continuous medium, since the continuous medium requires a protective film.

What is claimed is:

1. A magnetic recording medium comprising a hard disk as a nonmagnetic substrate and a coating film, the coating film containing magnetic powder and a binder including an epoxy resin, a phenolic resin and a vinyl resin, the coating film having a thickness of less than 0.5 $\mu$m and being formed on said substrate, the content of said magnetic powder in said coating film being 66 to 90% by weight based on the total weight of the coating film.

2. A magnetic recording medium according to claim 1, wherein the thickness of said coating film is at least 0.1 $\mu$m and less than 0.5 $\mu$m.

3. A magnetic recording medium according to claim 1, wherein the content of said magnetic powder in said coating film is 70 to 90% by weight based on the total weight of the coating film.

4. A magnetic recording medium according to claim 1, wherein said coating film contains a filler in the amount of 1 to 5% by weight based on the total weight of the coating film.

5. A magnetic recording medium according to claim 4, wherein the filler is selected from the group consisting of particulate alumina, zirconia, silicon carbide, tungsten carbide, sintered aluminum silicate, and calcium carbonate.

6. A magnetic recording medium according to claim 4, wherein the filler is in the form of particles having a diameter in the range of 0.2 to 1.2 $\mu$m.

7. A magnetic recording medium according to claim 1, wherein the vinyl resin is contained in the binder in an amount of at least 7% by weight of the magnetic powder contained in the coating film.

8. A magnetic recording medium according to claim 1, wherein the weight ratio of the epoxy resin to the phenolic resin is in the range of 8:2 to 2:8.

9. A magnetic recording medium according to claim 1, further comprising a layer of a silane coupling agent positioned between the substrate and said coating film, for coupling the substrate to the coating film, wherein the silane coupling layer has a thickness of 0.02 to 2 $\mu$m.

10. A magnetic recording medium according to claim 9, wherein the silane coupling agent has an amino group or an epoxy group as a terminal group thereof.

11. A magnetic recording medium according to claim 10, wherein the substrate is of aluminum, and the coating film includes a cured binder formed from a binder having an epoxy resin and phenolic resin.

12. A magnetic recording medium according to claim 1, wherein said binder has a melting point and a curing initiation temperature, the melting point being lower than or equal to the curing initiation temperature, and wherein said coating film is a film formed by applying a paint containing said binder and magnetic powder to said substrate and thereafter pressing the painted structure at a temperature equal to or greater than said melting point and equal to or below said curing initiation temperature.

13. A magnetic recording medium according to claim 9, wherein the silane coupling agent is selected from the group consisting of $\gamma$-aminoethyltriethoxysilane, $\gamma$-aminopropyltriethoxysilane, N-$\beta$-aminoethyl-$\gamma$-aminopropyltriethoxysilane, N-$\beta$-(aminoethyl)-$\gamma$-aminopropylmethyldimethoxysilane, $\gamma$-glycidoxypropyltrimethoxysilane, and $\beta$-(3,4-epoxycyclohexyl)ethyltrimethoxysilane.

14. A magnetic recording medium comprising a hard disk as a nonmagnetic substrate and a coating film, the coating film containing magnetic powder and a binder including an epoxy resin, a phenolic resin and a vinyl resin, the coating film having a thickness of less than 0.5 μm and being formed on said substrate, the content of said magnetic powder in said coating film being 66 to 90% by weight based on the total weight of the coating film, whereby the magnetic recording medium is a magnetic hard disk.

15. A magnetic recording medium comprising a disk as a hard nonmagnetic substrate and a coating film, the coating film containing magnetic powder and a binder including an epoxy resin, a phenolic resin and a vinyl resin, the coating film having a thickness of less than 0.5 μm and being formed on said substrate, the content of said magnetic powder in said coating film being 66 to 90% by weight based on the total weight of the coating film, the content of the vinyl resin in the binder being in the range of 16 to 75% by weight and the content of the total of the epoxy resin and the phenolic resin being in the range of 25 to 84% by weight.

* * * * *